United States Patent
Rancruel et al.

(10) Patent No.: US 8,141,367 B2
(45) Date of Patent: Mar. 27, 2012

(54) SYSTEM AND METHODS FOR PRE-HEATING FUEL IN A POWER PLANT

(75) Inventors: Diego Fernando Rancruel, Mauldin, SC (US); John Anthony Conchieri, Greenfield Center, NY (US); Michael Joseph Alexander, Simpsonville, SC (US); Joel Donnell Holt, Scotia, NY (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 12/783,220

(22) Filed: May 19, 2010

(65) Prior Publication Data

US 2011/0283706 A1    Nov. 24, 2011

(51) Int. Cl.
*F02C 1/00* (2006.01)
(52) U.S. Cl. ........................ 60/772; 60/39.182
(58) Field of Classification Search .............. 60/772, 60/783, 784, 39.182, 736; 122/7 R, 7 B
See application file for complete search history.

(56) References Cited

U.S. PATENT DOCUMENTS

| | | | |
|---|---|---|---|
| 4,099,374 A * | 7/1978 | Foster-Pegg | 60/39.12 |
| 4,932,204 A | 6/1990 | Pavel et al. | |
| 6,212,871 B1 | 4/2001 | Rakhmailov | |
| 6,253,554 B1 | 7/2001 | Kobayashi et al. | |
| 6,269,626 B1 | 8/2001 | Kim | |
| 6,389,794 B2 | 5/2002 | Ranasinghe et al. | |
| 6,499,302 B1 | 12/2002 | Ranasinghe | |
| 2003/0000218 A1 | 1/2003 | Ranasinghe | |

* cited by examiner

*Primary Examiner* — Ehud Gartenberg
*Assistant Examiner* — Vikansha Dwivedi
(74) *Attorney, Agent, or Firm* — Armstrong Teasdale LLP

(57) ABSTRACT

A method for assembling a fuel supply system for use with a power generation system. The method includes coupling a fuel heater to a fuel source for heating a fuel. A first heating assembly is coupled to the fuel heater for heating a first flow of water channeled to the fuel heater. A heat recovery steam generator assembly is coupled to the fuel heater for channeling a second flow of heated water to the fuel heater. A valve assembly is coupled between the first heating assembly, the heat recovery steam generator assembly, and the fuel heater to enable a flow of heated water from the first heating assembly and the heat recovery steam generator assembly to be selectively channeled to the fuel heater.

20 Claims, 3 Drawing Sheets

SYSTEM AND METHODS FOR PRE-HEATING FUEL IN A POWER PLANT

BACKGROUND OF THE INVENTION

The subject matter described herein relates generally to power generation systems and, more particularly, to systems and methods for use in pre-heating fuel in a power plant.

At least some known power generation systems include a multi-stage heat recovery steam generator (HRSG) that generates progressively lower grade steam from each successive stage in the exhaust of a gas turbine engine. The HRSG uses relatively high grade heat channeled from exhaust gases from a gas turbine engine. Known HRSGs are capable of generating relatively high pressure steam in a high pressure stage or section of the HRSG. After heat is removed from the gas in the high pressure stage, the gas is channeled to an intermediate pressure stage wherein the cooler gas is only capable of generating a relatively lower pressure or intermediate pressure steam.

To increase an operating efficiency of known power plants, the fuel supplied to the gas turbine engine is typically preheated. In at least some known power generation systems, to pre-heat the fuel, water is channeled from sections of the HSRG to a multi-stage fuel heater. However, in generally known power generating systems, the gas turbine engine must be operated in a start-up operation for a period of time before the exhaust gases are at a sufficient heat to enable the HRSG to produce heated water at a sufficient temperature for use in pre-heating the fuel. During start-up operation, the fuel includes a lower temperature that causes the gas turbine to operate at a less efficient operating load that requires an increase in fuel consumption.

BRIEF DESCRIPTION OF THE INVENTION

In one embodiment, a method for assembling a fuel supply system for use with a power generation system is provided. The method includes coupling a fuel heater to a fuel source for heating a fuel. A first heating assembly is coupled to the fuel heater for heating a first flow of water channeled to the fuel heater. A heat recovery steam generator assembly is coupled to the fuel heater for channeling a second flow of heated water to the fuel heater. A valve assembly is coupled between the first heating assembly, the heat recovery steam generator assembly, and the fuel heater to enable a flow of heated water from the first heating assembly and the heat recovery steam generator assembly to be selectively channeled to the fuel heater.

In another embodiment, a fuel supply system for use with a power generating system is provided. The fuel supply system includes a fuel heater coupled in flow communication with a fuel source. The fuel heater is for heating fuel supplied from the fuel source. A first heating assembly is coupled in flow communication with the fuel heater for heating a first flow of water channeled to the fuel heater. A heat recovery steam generator assembly is coupled in flow communication with the fuel heater for channeling a second flow of heated water to the fuel heater. A valve assembly is coupled between the first heating assembly, the heat recovery steam generator assembly, and the fuel heater to enable a flow of heated water from the first heating assembly and the heat recovery steam generator assembly to be selectively channeled to the fuel heater.

In yet another embodiment, a power generating system is provided. The power generating system includes a gas turbine generator assembly, a steam generator assembly thermally coupled to the gas turbine generator assembly for receiving at least a portion of exhaust gases channeled from the gas turbine generator assembly, and a fuel supply system coupled to the gas turbine generator assembly for channeling a flow of heated fuel to the gas turbine engine assembly. The fuel supply system includes a fuel heater coupled in flow communication with a fuel source. The fuel heater is for heating fuel supplied from the fuel source. A first heating assembly is coupled in flow communication with the fuel heater for heating a first flow of water channeled to the fuel heater. A heat recovery steam generator assembly is coupled in flow communication with the fuel heater for channeling a second flow of heated water to the fuel heater. A valve assembly is coupled between the first heating assembly, the heat recovery steam generator assembly, and the fuel heater to enable a flow of heated water from the first heating assembly and the heat recovery steam generator assembly to be selectively channeled to the fuel heater.

DETAILED DESCRIPTION OF THE INVENTION

The exemplary methods and systems described herein overcome disadvantages of known power generation systems by providing a fuel gas heating assembly that facilitates improved heating of a fuel gas flow, for example. Moreover, the embodiments described herein channel a flow of heated water from an auxiliary boiler system to a fuel gas heater to enable a fuel gas heater to preheat fuel before the HRSG has obtained a predefined temperature. In addition, the embodiments described herein channel a flow of heated water to a fuel gas heater during a start-up operation of a gas turbine engine to facilitate reducing the time required for the gas turbine engine start-up operation and facilitating a rapid start-up operation for the gas turbine engine.

Figure 1:
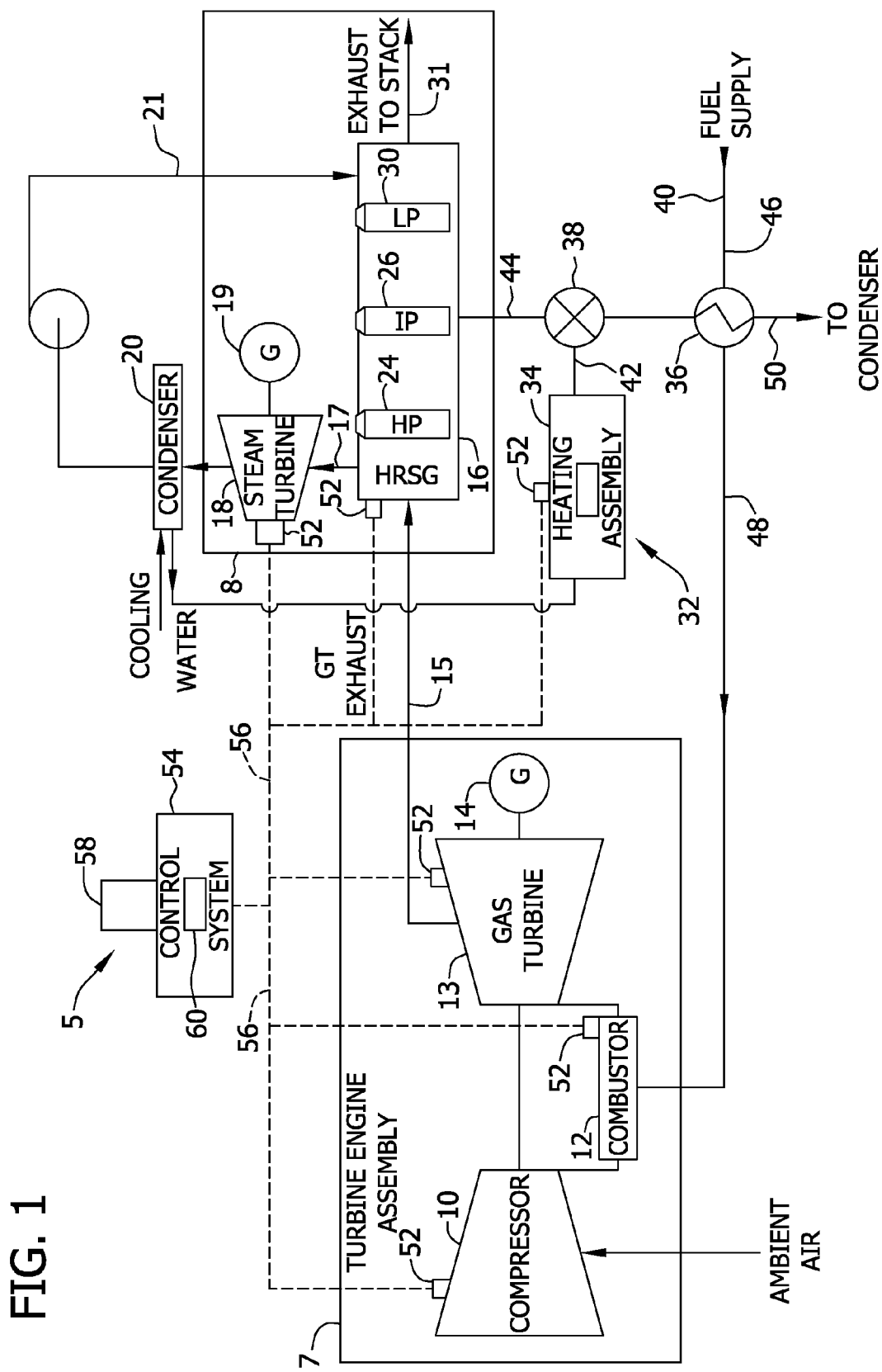
FIG. 1 is a schematic illustration of an exemplary power generation system.

FIG. 1 is a schematic illustration of an exemplary power generation system 5. In the exemplary embodiment, power generation system 5 includes a top cycle or gas turbine engine assembly 7 and a bottom cycle or steam turbine assembly 8. Gas turbine engine assembly 7 includes a compressor 10, a combustor 12, and a turbine 13 powered by gases discharged from the combustor 12. Turbine 13 drives an electrical generator 14. Steam turbine assembly 8 includes a heat recovery steam generator (HRSG) 16 and a steam turbine 18 that is coupled to a generator 19. Exhaust gases from gas turbine 13 are channeled through a conduit 15 to HRSG 16 for use in recovering waste heat from the exhaust gases.

In the exemplary embodiment, HRSG 16 includes a high pressure (HP) section 24, an intermediate pressure (IP) section 26, and a low pressure (LP) section 30. Moreover, in the exemplary embodiment, HRSG 16 transfers progressively lower grade heat from exhaust gases to water circulating through each progressively section 24, 26, and 30. Each of the HP, IP, and LP sections 24, 26, and 30 may include an economizer, an evaporator, a superheater and/or a feedwater heater or other pre-heaters associated with the respective section, such as but not limited to a high pressure section pre-heater, any or all of which may be split into multiple heat exchangers that are positioned in one or more of the sections (HP,IP,LP) 24, 26, and/or 30.

Water is channeled to HRSG 16 through conduit 21 to generate steam. Heat recovered from the exhaust gases channeled to HRSG 16 is transferred to water/steam in the HRSG 16 for use in producing steam that is supplied through line 17 to steam turbine 18. It should be noted that line 17 may include multiple steam lines for use in supplying steam produced at different pressure levels to steam turbine 18. Cooled gases from the HRSG 16 are discharged into the atmosphere via an exit duct 31 and via a stack (not shown).

In the exemplary embodiment, power generation system 5 also includes a fuel supply system 32 for use in heating a flow of fuel 40 channeled to turbine engine assembly 7. Moreover, in the exemplary embodiment, fuel supply system 32 is coupled to a first heating assembly 34 and a fuel performance heater 36. Moreover, a valve assembly 38 is coupled between HRSG 16, first heating assembly 34, and performance heater 36. HRSG 16 and first heating assembly 34 are each coupled to performance heater 36, and each channels a flow of heated water to performance heater 36. Valve assembly 38 is coupled in flow communication to HRSG 16 and first heating assembly 34 to enable a flow of heated water to be selectively channeling to performance heater 36. More specifically, a first flow 42 of heated water is channeled from first heating assembly 34 to fuel performance heater 36 through valve assembly 38, and/or a second flow 44 of heated water from HRSG 16 may be selectively channeled to fuel performance heater 36 through valve assembly 38. Once entering performance heater 36, fuel 40 is channeled through an inlet flow conduit 46, wherein the fuel 40 receives heat transferred from first heated water flow 42 and/or second heated water flow 44. Heated fuel 40 is then channeled to combustor 12 through an outlet conduit 48, and the cooled flow 50 of heating water is recirculated to condenser 20.

During operation, power generation system 5 is monitored by several sensors 52 that detect various conditions of gas turbine engine assembly 7, steam turbine assembly 8, and/or fuel supply system 32. Sensors 52 may include gas sensors, temperature sensors, flow sensors, speed sensors, flame detector sensors, valve position sensors, and/or any other sensors that sense various parameters relative to the operation of power generation system 5. As used herein, the term "parameters" refers to physical properties whose values can be used to define the operating conditions of power generation system 5, such as temperatures, pressures, and gas flows at defined locations.

In the exemplary embodiment, a control system 54 communicates with sensors 52 via communication links 56, which may be implemented in hardware and/or software. In one embodiment, communication links 56 remotely communicate data signals to and from control system 54 in accordance with any wired or wireless communication protocol known to one of ordinary skill in the art guided by the teachings herein. Such data signals may include, but are not limited to one including, signals indicative of operating conditions of sensors 52 transmitted to the control system 54 and/or various command signals communicated by control system 54 to sensors 52.

Control system 54 may be a computer system that includes a display 58 and at least one processor 60. Control system 54 executes programs to control the operation of power generation system 5 using sensor inputs and instructions from human operators. User input functionality is provided in display 58, which acts as a user input selection device. In the exemplary embodiment, display 58 is responsive to the user pressing contact on display 58 to selectively perform functionality. Display 58 may also include a keypad that operates in a conventional well known manner. Thus, the user can operate desired functions available with control system 54 by contacting a surface of display 58. Commands generated by control system 54 cause sensors 52 to monitor operations of power generation system 5 and to activate other control settings on power generation system 5.

In the embodiments described herein, memory may include, without limitation, a computer-readable medium, such as a random access memory (RAM), and a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, power generation system 5 control commands. The execution of sequences of instructions is not limited to any specific combination of hardware circuitry and software instructions.

Figure 2:
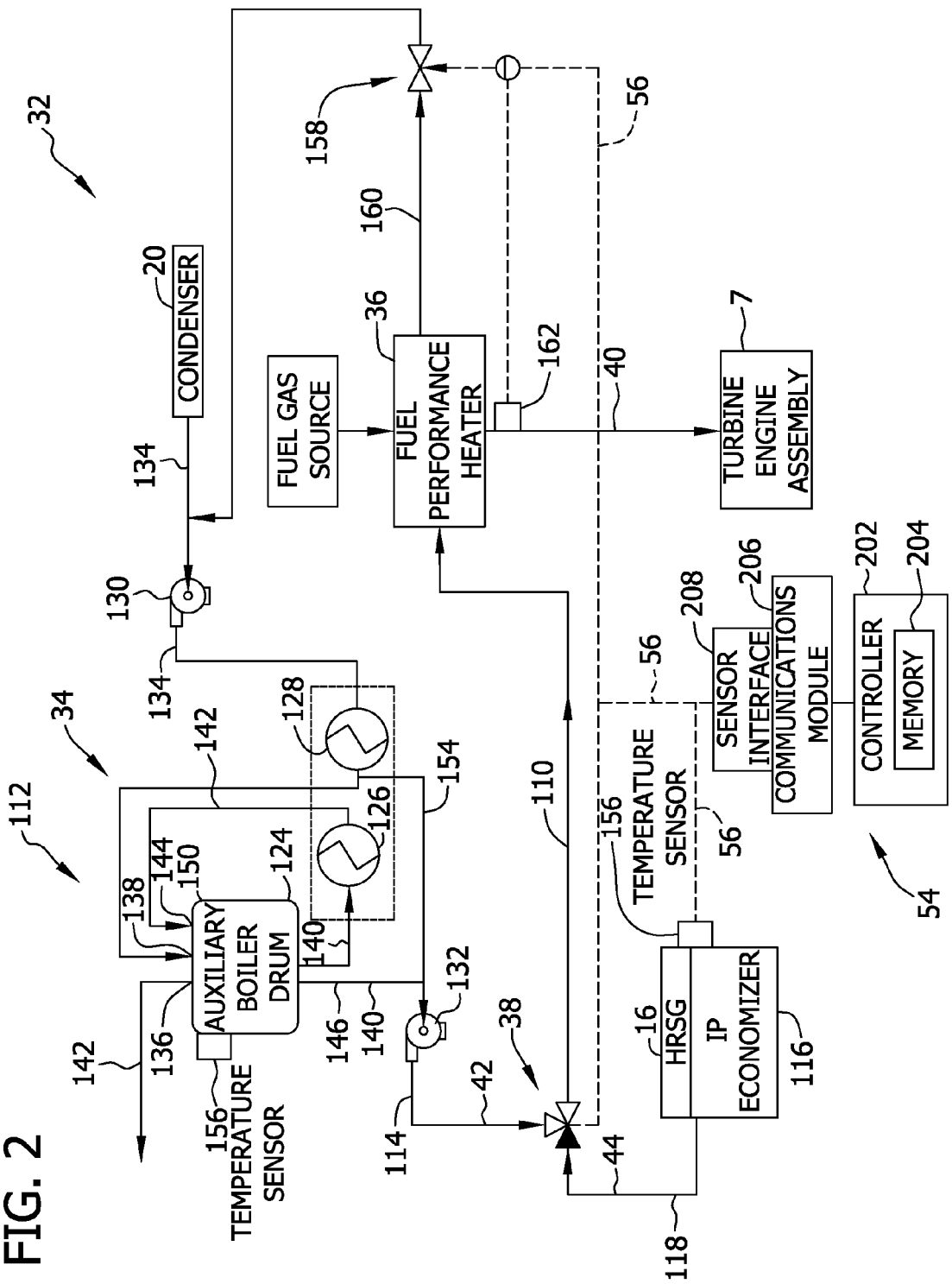
FIG. 2 is a schematic illustration of an exemplary fuel supply system that may be used with the power generation system shown in FIG. 1.

FIG. 2 is a schematic illustration of an exemplary fuel supply system 32 that may be used with power generation system 5 (shown in FIG. 1). Components shown in FIG. 1 are labeled with the same reference numbers in FIG. 2. In the exemplary embodiment, fuel supply system 32 includes fuel performance heater 36 coupled in flow communication with first heating assembly 34 and with HRSG 16. At least one valve assembly 38 is coupled in flow communication with fuel performance heater 36, first heating assembly 34, and HRSG 16 to enable a flow of heated water to be selectively channeled from first heating assembly 34 and HRSG 16 to fuel performance heater 36. Valve assembly 38 enables first heated water flow 42 to be channeled to fuel performance heater 36 through a first conduit 110. In the exemplary embodiment, first heating assembly 34 includes an auxiliary boiler assembly 112 that discharges a first heated water flow 42 to fuel performance heater 36 through a second conduit 114. HRSG 16 includes an IP economizer 116 that channels a second heated water flow 44 to fuel performance heater 36 through a third conduit 118. In the exemplary embodiment, valve assembly 38 is coupled in flow communication with each of second conduit 114 and third conduit 118 to enable a flow of heated water to be selectively channeled from second conduit 114 and third conduit 118 to first conduit 110. In one embodiment, valve assembly 38 is a three-way valve. Alternatively, valve assembly 38 may be any suitable valve that enables fuel supply system 32 to function as described herein.

In the exemplary embodiment, valve assembly 38 is movable between a first valve position (shown in FIG. 2) and a second valve position (not shown). In the first valve position, a flow of first heated water flow 42 is channeled from first heating assembly 34 to fuel performance heater 36, and second heated water flow 44 is prevented from being channeled from HRSG 16 to fuel performance heater 36. In the second valve position, a flow of second heated water flow 44 is channeled from HRSG 16 to fuel performance heater 36 and first heated water flow 42 is prevented from being channeled from first heating assembly 34 to fuel performance heater 36. During operation of fuel supply system 32, valve assembly 38 is in the first valve position when a temperature of second heated water flow 44 from HRSG 16 is less than a predefined temperature. When the temperature of second heated water flow 44 is approximately equal to, or greater than, the predefined temperature, valve assembly 38 moves to the second valve position.

In the exemplary embodiment, auxiliary boiler assembly 112 includes an auxiliary boiler drum 124, a first heat exchanger or evaporator 126, a second heat exchanger or economizer 128, a boiler feed pump 130, and a heated water pump 132. Condenser 20 channels a flow 134 of water to boiler feed pump 130. Boiler feed pump 130 increases a pressure of flow 134 and channels pressurized flow 134 to economizer 128. Boiler feed pump 130 also provides a sufficient head to pump flow 134 through economizer 128 and auxiliary boiler drum 124 to an outlet 136 of auxiliary boiler drum 124. Economizer 128 increases a temperature of flow 134 to a first temperature and channels flow 134 to a first inlet 138 of auxiliary boiler drum 124. Auxiliary boiler drum 124 separates flow 134 into a saturated water flow 140 and a saturated steam flow 142. Saturated steam flow 142 is channeled from auxiliary boiler drum 124 through outlet 136. Evaporator 126 is coupled to auxiliary boiler drum 124 and receives at least a first portion of saturated water flow 140 from auxiliary boiler drum 124. Saturated water flow 140 is channeled from evaporator 126 to auxiliary boiler drum 124 through a second inlet 144.

A conduit 146 is coupled to auxiliary boiler drum 124 and channels at least a second portion of saturated water flow 140 from auxiliary boiler drum 124 to heated water pump 132 as first heated water flow 42. Heated water pump 132 increases a pressure of saturated water flow 140 prior to saturated water flow 140 being discharged through conduit 114 to fuel performance heater 36.

In one embodiment, auxiliary boiler drum 124 includes a water-tube boiler tank 150. Alternatively, auxiliary boiler drum 124 includes a fired-tube boiler tank 152. In yet another alternative embodiment, economizer 128 is coupled to heated water pump 132 for channeling flow 134 as first heated water flow 42 through an economizer conduit 154.

In the exemplary embodiment, at least one temperature sensor 156 is coupled to HRSG 16 for sensing a temperature of water flow 44 channeled from HRSG 16 to fuel performance heater 36. Upon sensing a temperature, temperature sensor 156 transmits a signal indicative of the temperature of second heated water flow 44 to control system 54. In the exemplary embodiment, one or more temperature sensors 156 are coupled to conduit 118 and/or IP economizer 116 to sense a temperature of water flow 44 channeled from HRSG 16 to valve assembly 38.

Control system 54 includes a controller 202, a memory 204, and a communications module 206. Moreover, communications module 206 includes a sensor interface 208 that enables controller 202 to communicate with any sensor 156 mounted at any suitable location within fuel supply system 32. In one embodiment, sensor interface 208 includes an analog-to-digital converter that converts an analog voltage signal generated by the sensor to a multi-bit digital signal that is usable by controller 202. In alternative embodiments, communications module 206 may include any suitable wired and/or wireless communications device that facilitates transmitting signals to, and/or receiving signals from, any device located on or within fuel supply system 32 and/or located remotely from fuel supply system 32. In the exemplary embodiment, memory 204 may include any suitable storage device, including, but not limited to, flash memory, electronically erasable programmable memory, read only memory (ROM), removable media, and/or other volatile and non-volatile storage devices. In one embodiment, executable instructions (i.e., software instructions) are stored in memory 204 for use by controller 202 in controlling valve assembly 38, as described below.

Controller 202 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 202 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome. A processor may include a processing unit, such as, without limitation, an integrated circuit (IC), an application specific integrated circuit (ASIC), a microcomputer, a programmable logic controller (PLC), and/or any other programmable circuit. A processor may include multiple processing units (e.g., in a multi-core configuration). Controller 202 is configurable to perform the operations described herein by programming the corresponding processor. For example, a processor may be programmed by encoding an operation as one or more executable instructions and providing the executable instructions to the processor by embodying the executable instructions in a memory area (also shown in FIGS. 11 and 12) coupled to the processor. A memory area may include, without limitation, one or more random access memory (RAM) devices, one or more storage devices, and/or one or more computer readable media.

Temperature sensor 156 is communicatively coupled to controller 202 across any suitable wired and/or wireless communication medium to facilitate enabling temperature sensor 156 to transmit signals to and/or receive signals from controller 202. Moreover, temperature sensor 156 continuously senses temperatures in second heated water flow 44, and temperature sensor 156 continuously transmits signals indicative of sensed temperatures to controller 202 in real-time. In one embodiment, controller 202 may be programmed to continuously receive and monitor signals transmitted by temperature sensor 156. In an alternative embodiment, controller 202 may not continuously receive and/or monitor signals transmitted by temperature sensor 156 but, rather, controller 202 may be programmed to iteratively request signals from temperature sensor 156 at predefined time intervals. In certain embodiments, controller 202 and/or temperature sensor 156 may transmit signals to and/or receive signals at any suitable time intervals.

In the exemplary embodiment, control system 54 is in communication with fuel supply system 32. For example, control system 54 may be coupled with a link, such as a conductor, a wire, and/or a data link, to two or more components of fuel supply system 32 to enable signals, electric currents, and/or commands to be communicated between the components. The link enables one component to control an operation of another component of fuel supply system 32 using the communicated signals, electric currents, and/or commands. In one embodiment, control system 54 may be directly coupled in communication with valve assembly 38 and/or may be coupled in communication with valve assembly 38 via a communication hub and/or any other suitable communication device(s).

During operation of fuel supply system 32, control system 54 receives a signal from temperature sensor(s) 156 that is indicative of a temperature measured by temperature sensor(s) 156 in second heated water flow 44. Moreover, in the exemplary embodiment, controller 202 determines the operation of valve assembly 38 based on the measured temperature(s) obtained from temperature sensor(s) 156 and based on a comparison to a predefined temperature. In the exemplary embodiment, control system 54 positions valve assembly 38 in a first position (shown in FIG. 2) when a measured temperature of second heated water flow 44 from HRSG 16 is less than a predefined temperature. In the first position, first heated water flow 42 is channeled from first heating assembly 34 to fuel performance heater 36 and second heated water flow 44 is prevented from being channeled from HRSG 16 to fuel performance heater 36. After sensing a temperature of second heated water flow 44 that is approximately equal to, or greater than, a predefined temperature, control system 54 positions valve assembly 38 to a second position (not shown). In the second position, second heated water flow 44 is channeled from HRSG 16 to fuel performance heater 36 and first heated water flow 42 is prevented from being channeled from first heating assembly 34 to fuel performance heater 36.

In the exemplary embodiment, fuel performance heater 36 includes a temperature control valve 158 that is coupled to fuel performance heater 36 to enable a flow 160 of heated water to be channeled from fuel performance heater 36 to condenser 20. A temperature sensor 162 is coupled to fuel performance heater 36 for sensing a temperature of fuel 40 channeled to gas turbine engine assembly 7 and for transmitting a signal indicative of the temperature to control system 54. In the exemplary embodiment, temperature control valve 158 regulates a temperature of fuel 40 channeled to gas turbine engine assembly 7 by controlling a flow of heated water flow 160 from fuel performance heater 36. After sensing a temperature in fuel 40 that is higher than a predefined temperature, control system 54 operates temperature control valve 158 to increase an amount of heated water flow 160 from fuel performance heater 36 to facilitate reducing the heat transferred to fuel 40 from heated water flow 160. After sensing a temperature of fuel 40 that is less than a predefined temperature, control system 54 operates temperature control valve 158 to restrict an amount of heated water flow 160 channeled from fuel performance heater 36 to facilitate increasing the transfer of heat from heated water flow 160 to fuel 40, thereby increasing a temperature of fuel 40.

Figure 3:
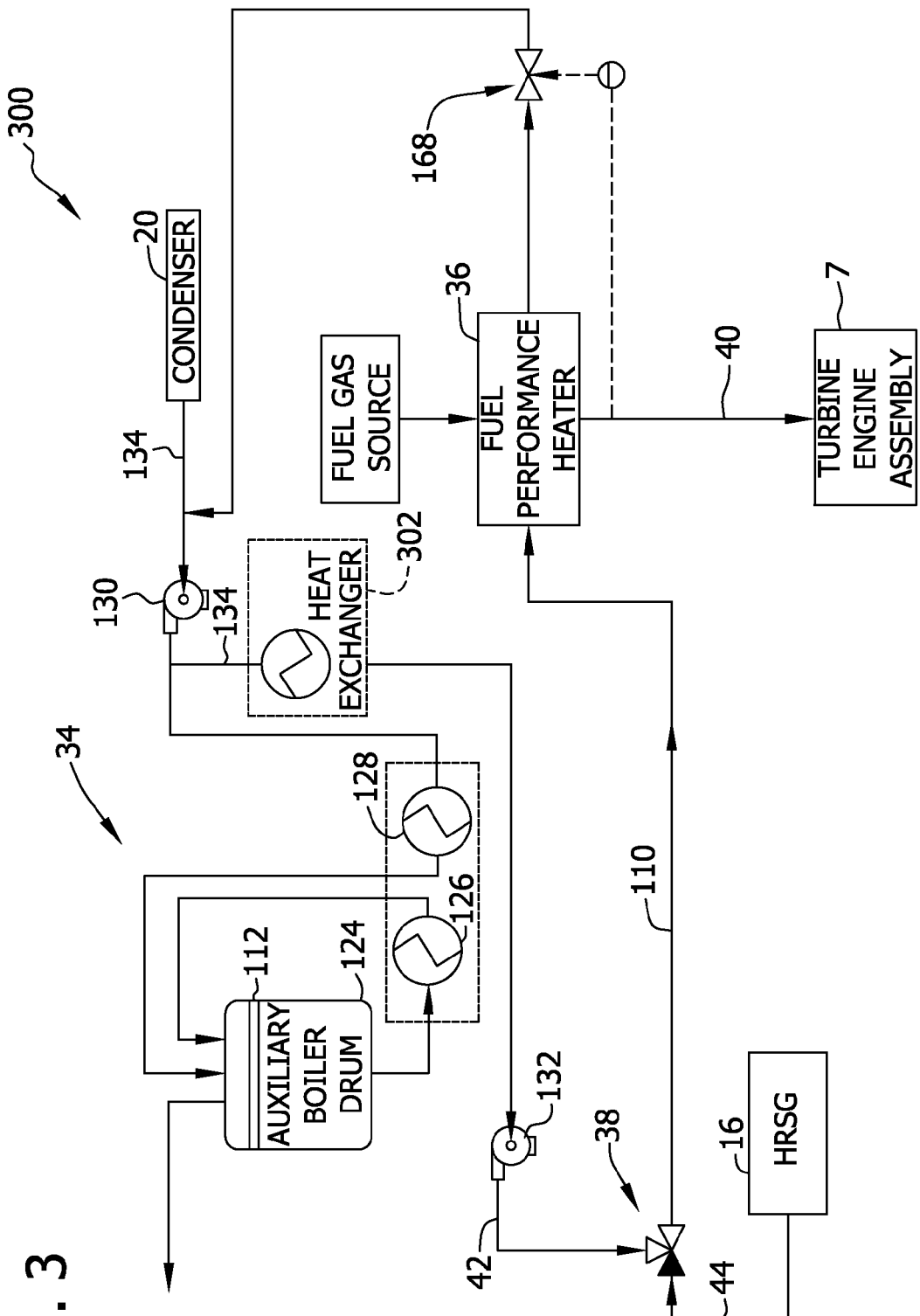
FIG. 3 is a schematic illustration of an alternative fuel supply system that may be used with the power generation system shown in FIG. 1.

FIG. 3 is a schematic illustration of an alternative fuel supply system 300 that may be used with power generation system 5 (shown in FIG. 1). Components shown in FIG. 2 are labeled with the same reference numbers in FIG. 3. In an alternative embodiment, first heating assembly 34 includes a third heat exchanger 302 that is coupled between boiler feed pump 130 and heated water pump 132 to enable first heated water flow 42 to be channeled from boiler feed pump 130 to fuel performance heater 36. Third heat exchanger 302 increases a temperature of flow 134 and channels flow 134 to boiler feed pump 130. In one embodiment, third heat exchanger 302 is a fired water heater. In another embodiment, third heat exchanger 302 is any other heat exchanger capable of heating water to a specified temperature to enable fuel supply system 300 to function as described herein.

The above-described embodiments provide a cost-effective and reliable means of improving the efficiency of the power generation system using water heated in a multi-stage heat exchanger. More specifically, the systems and assemblies described herein facilitate providing a heated water to a fuel gas heater to enable a rapid start-up operation of a gas turbine engine. Moreover, the systems and assemblies described herein facilitate improving the efficiency of a power plant by pre-heating the incoming fuel to a temperature that is possible before the HRSG is operating at a predefined temperature. In addition, the above-described systems and assemblies facilitate increasing the temperature of fuel channeled to the gas turbine combustor such that the amount of fuel required during the combustion process to attain the required combustion temperature is facilitated to be reduced. As such, the overall efficiency of the power generation cycle is also increased. As a result, the systems and assemblies described herein facilitate increasing the efficiency of the power generation system in a cost-effective and reliable manner.

Exemplary embodiments of a system and methods for pre-heating fuel in a power plant are described above in detail. The methods and apparatus are not limited to the specific embodiments described herein, but rather, components of systems and/or steps of the method may be utilized independently and separately from other components and/or steps described herein. For example, the system and assemblies may also be used in combination with other combustion systems and methods, and are not limited to practice with only the power generating system as described herein. Rather, the exemplary embodiment can be implemented and utilized in connection with many other power generating system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for assembling a fuel supply system for use with a power generation system, said method comprising:
coupling a fuel heater to a fuel source for heating a fuel;

coupling a first heating assembly to the fuel heater for heating a first flow of water channeled to the fuel heater;
coupling a heat recovery steam generator assembly to the fuel heater for channeling a second flow of heated water to the fuel heater; and
coupling a valve assembly between the first heating assembly, the heat recovery steam generator assembly, and the fuel heater to enable a flow of heated water from the first heating assembly and the heat recovery steam generator assembly to be selectively channeled to the fuel heater.

2. A method in accordance with claim 1 further comprising coupling a fired heat exchanger to the fuel heater for increasing a temperature of the first flow of heated water to the fuel heater.

3. A method in accordance with claim 1 further comprising coupling an auxiliary boiler assembly to the fuel heater for increasing a temperature of the first flow of heated water to said fuel heater.

4. A method in accordance with claim 1, wherein the heat recovery steam generator includes a high pressure section, an intermediate pressure section, and a low pressure section, said method further comprising coupling the intermediate pressure section to the fuel heater assembly for increasing a temperature of the second flow of heated water to the fuel heater assembly.

5. A fuel supply system for use with a power generating system, said fuel supply system comprising:
a fuel heater coupled in flow communication with a fuel source, said fuel heater for heating fuel supplied from the fuel source;
a first heating assembly coupled in flow communication with said fuel heater for heating a first flow of water channeled to said fuel heater;
a heat recovery steam generator assembly coupled in flow communication with said fuel heater for channeling a second flow of heated water to said fuel heater; and
a valve assembly coupled between said first heating assembly, said heat recovery steam generator assembly, and said fuel heater to enable a flow of heated water from said first heating assembly and said heat recovery steam generator assembly to be selectively channeled to said fuel heater.

6. A fuel supply system in accordance with claim 5, wherein said first heating assembly comprises a fired heat exchanger coupled in flow communication with said fuel heater for increasing a temperature of the first flow of heated water channeled to said fuel heater.

7. A fuel supply system in accordance with claim 5, wherein said first heating assembly comprises an auxiliary boiler assembly coupled in flow communication with said fuel heater for increasing a temperature of the first flow of heated water channeled to said fuel heater.

8. A fuel supply system in accordance with claim 7, wherein said auxiliary boiler assembly comprises an economizer coupled to said fuel heater.

9. A fuel supply system in accordance with claim 7, wherein said auxiliary boiler assembly comprises a boiler tank, said boiler tank coupled to said fuel heater.

10. A fuel supply system in accordance with claim 9, wherein said boiler tank comprises one of a fired-tube boiler tank and a water-tube boiler tank.

11. A fuel supply system in accordance with claim 9, wherein said auxiliary boiler assembly further comprises a heated water pump coupled between said valve assembly and said boiler tank.

12. A fuel supply system in accordance with claim 5, further comprising at least one sensor coupled to said heat recovery steam generator assembly for sensing a temperature of the second flow of heated water, said sensor is communicatively coupled to a controller, said controller configured to operate said valve assembly to channel the first flow of heated water from said first heater assembly to said fuel heater when the sensed temperature is less than a predefined temperature.

13. A fuel supply system in accordance with claim 12, wherein said controller is configured to operate said valve assembly to channel the second flow of heated water from said second heater assembly to said fuel heater when the sensed temperature is substantially equal to or greater than a predefined temperature.

14. A fuel supply system in accordance with claim 5, wherein said heat recovery steam generator comprises a high pressure section, an intermediate pressure section, and a low pressure section, said intermediate pressure section comprising an intermediate economizer coupled in flow communication with said fuel heater assembly for increasing a temperature of the second flow of heated water to said fuel heater assembly.

15. A power generating system comprising:
a gas turbine generator assembly;
a steam generator assembly thermally coupled to said gas turbine generator assembly for receiving at least a portion of exhaust gases channeled from said gas turbine generator assembly; and
a fuel supply system coupled to said gas turbine generator assembly for channeling a flow of heated fuel to said gas turbine engine assembly, said fuel supply system comprising:
a fuel heater coupled in flow communication with a fuel source, said fuel heater for heating fuel supplied from the fuel source;
a first heating assembly coupled in flow communication with said fuel heater for heating a first flow of water channeled to said fuel heater;
a heat recovery steam generator assembly coupled in flow communication with said fuel heater for channeling a second flow of heated water to said fuel heater; and
a valve assembly coupled between said first heating assembly, said heat recovery steam generator assembly, and said fuel heater to enable a flow of heated water from said first heating assembly and said heat recovery steam generator assembly to be selectively channeled to said fuel heater.

16. A power generating system in accordance with claim 15, wherein said first heating assembly comprises a fired heat exchanger coupled in flow communication with said fuel heater for increasing a temperature of the first flow of heated water to said fuel heater.

17. A power generating system in accordance with claim 15, wherein said first heating assembly comprises an auxiliary boiler assembly coupled in flow communication with said fuel heater for increasing a temperature of the first flow of heated water to said fuel heater.

18. A power generating system in accordance with claim 15, wherein said heat recovery steam generator comprises a high pressure section, an intermediate pressure section, and a low pressure section, said intermediate pressure section comprising an intermediate economizer coupled in flow communication with said fuel heater assembly for increasing a temperature of the second flow of heated water to said fuel heater assembly.

19. A power generating system in accordance with claim 15, further comprising at least one sensor coupled to said heat recovery steam generator assembly for sensing a temperature of the second flow of heated water, said sensor is communicatively coupled to a controller, said controller configured to operate said valve assembly to channel the first flow of heated water from said first heater assembly to said fuel heater when the sensed temperature is less than a predefined temperature.

20. A power generating system in accordance with claim 19, wherein said controller is configured to operate said valve assembly to channel the second flow of heated water from said second heater assembly to said fuel heater when the sensed temperature is substantially equal to or greater than a predefined temperature.

* * * * *